United States Patent [19]

Pierret et al.

[11] 3,843,942

[45] Oct. 22, 1974

[54] EQUALIZER FOR PHASE MODULATION COMMUNICATION SYSTEMS USING THE INSTANTANEOUS SIGNAL AMPLITUDE WEIGHTED BY SIGNAL ENVELOPE AMPLITUDE DISTORTION AS AN ADJUSTMENT CONTROL SIGNAL

[75] Inventors: Jean-Marc Pierret, Nice; Alex Honore Lautier, Vence; Francis Paul Maddens, Cagnes sur Mer; Henri Jean Nussbaumer, La Gaude, all of France

[73] Assignee: International Business Machines Corporation, Armonk, N.Y.

[22] Filed: Apr. 25, 1973

[21] Appl. No.: 354,413

[30] Foreign Application Priority Data

Apr. 26, 1972 France .............................. 72.15578

[52] U.S. Cl. ....................... 333/18, 325/65, 328/167

[51] Int. Cl. ........................... H03h 7/16, H04b 3/04

[58] Field of Search ................ 325/30, 65; 328/167; 333/18, 70 T

[56] References Cited

UNITED STATES PATENTS

| | | | |
|---|---|---|---|
| 3,283,063 | 11/1966 | Kawashima et al. | 333/18 X |
| 3,564,457 | 2/1971 | Farrow | 333/18 |
| 3,743,975 | 7/1973 | Kao | 333/18 |

*Primary Examiner*—Paul L. Gensler
*Attorney, Agent, or Firm*—John B. Frisone

[57] ABSTRACT

A self-adjustable equalizer for a phase modulation communication system in which the equalizer output signal *s* is sampled at the modulation rate and weighted by a factor proportional to envelope amplitude distortion dR/R, R being the envelope amplitude at given instants and the product *s*dR/R being the adjustment control signal. In the preferred embodiment the product of the sign of *s* and the sign of *d*R serves as the control or error signal. One implementation frequency translates the equalizer output signal and compares the amplitude of the translated signal with a reference at given instants to determine the sign of dR which is eventually multiplied by the sign of *s*.

7 Claims, 3 Drawing Figures

EQUALIZER FOR PHASE MODULATION COMMUNICATION SYSTEMS USING THE INSTANTANEOUS SIGNAL AMPLITUDE WEIGHTED BY SIGNAL ENVELOPE AMPLITUDE DISTORTION AS AN ADJUSTMENT CONTROL SIGNAL

BACKGROUND OF THE INVENTION

This invention concerns phase-modulation transmission systems and more particularly, it concerns the so-called equalizers used to rectify the linear distortions introduced into the transmitted data signal by the transmission medium, before final detection of the data.

Phase modulation is the type of transmission wherein the carrier frequency phase is modified in terms of the data to be transmitted. In the phase modulation type the most widely used at present, the so-called phase-shift keying modulation (PSK), transmission is based on the continuous emission of a carrier which is subjected to a phase shift for each data element or group of data elements to be transmitted. When the resulting phase of the carrier is directly representative of the data element, the PSK modulation is said direct, when the phase shift with respect to the preceding phase is representative of the data element, then, the PSK modulation is said to be differential. The latter type is preferred in practice for it requires no absolute phase reference, which is always difficult to obtain at reception of the transmitted signal.

As the rate of the transmitted data increases, problems relative to distortions introduced by the transmission media become more important. In order to solve these problems, it has been proposed to provide a device for correcting the received data signal, before data detection, the function of said device being to compensate for linear distortions introduced by the transmission medium. Such devices are known as "equalizers." In brief, an equalizer is a variable transfer function network in which the transfer function is adjusted in terms of an error signal obtained by comparing the output signal of the equalizer with a reference signal. The type of equalizer most in use at present is the automatic transversal equalizer a description of which is given in the book by R. W. Lucky, J. Salz and E. J. Weldon Jr. published by Mc Graw-Hill Book Company in 1968 under the title: "Principles of Data Communications" (chapter VI). Such a description applies to amplitude-modulation transmission systems wherein the data signal is either base-band-transmitted or brought back within the baseband before equalization. The error signal is obtained by comparing the amplitude levels of the received signals with reference levels determined by means of test signals sent before the data transmission proper.

The same principle has been utilized for phase-modulation transmissions. Indeed, it has been proposed to consider the PSK modulation technique as equivalent to an amplitude-modulation transmission over two channels using two carriers in quadrature. Thus, equalization is carried out, as disclosed above, in either channel, allowing for interaction between the two channels. Of course, before equalization, the received signal must be demodulated by the two carriers in quadrature. A more detailed description of this technique, may be found in the contribution for Special Committee A No. 171, Dec. 1971, published by CCITT, Geneva, Switzerland.

Such a demodulation is not desirable, at least before equalization, for many a reason. More particularly, if it is desired to make use of digital techniques, such a modulation entails multiplying the analog-to-digital conversions, and conversely, for some operations have to be carried out on the signal before demodulation (removal of pilot frequencies which can possibly be transmitted with the data, in order to enable the clock of the carriers to be recovered, introduction of delays in order to compensate for the delays during the operation of auxiliary circuits, such as circuits for recovering an adequate carrier, (etc..) whereas some others, such as equalization, have to be carried out after demodulation. French patent application Ser. No. 72 01 484 filed in France, in the name of Compagnie IBM France on Jan. 10, 1972 under the title: "Perfectionnement aux systemes d'egalisation" presents a number of techniques which eliminate the need for demodulation of the received signal before equalization. The general principle disclosed in said application consists in carrying out the equalization in the frequency domain where the transmission has been carried out, i.e., without modulation or demodulation before equalization. On the other hand, the generation of the error signal with which it is possible to adjust the equalizer, is carried out in a different frequency domain chosen so as to be the one wherein the definition of a reference signal is the simplest.

The adaptation of the general principle disclosed in the above application, to a phase modulation transmission system, therefore, raises the following problem: how to obtain an error signal at the equalizer output for controlling the adjustment of such an equalizer?

SUMMARY OF THE INVENTION

The main object of this invention is to provide a technique for generating an error signal at the equalizer output for a phase-modulation transmission, when such equalizer operates directly in the frequency domain wherein the transmission is carried out.

Another object of this invention is to provide an error signal generation technique for the adjustment of a phase-modulation transmission equalizer, which is very simple and which lends itself very easily to the use of digital circuits.

This invention is based on the analysis of what is effectively the error presented by a data signal received at the end of a phase-modulation transmission. When making use of the Fresnel diagram to visualize the phase-modulation principle, a given data element is represented by vector OT in a system or orthogonal axes in which the horizontal axis is representative of a given phase reference, and the vertical axis is representative of the phase in quadrature (see the diagram shown hereunder). Such a vector shows a phase argument $\phi$ and an amplitude (module) Ro. The corresponding signal received at the other end of the transmission medium at the sampling instant, can be represented by a vector $\overrightarrow{OX}$ having $\phi$ for an argument and R for a module.

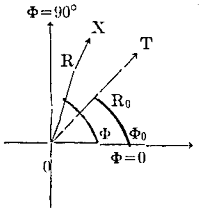

Let $s = R \cos \phi$ $\hat{s} = R \sin \phi$ then $s$ and $\hat{s}$ are representative of the components of the received vector $\vec{OX}$ on both axes of the diagram. As a matter of fact, should the succession of vectors $\vec{OX}$ be considered during the transmission of a complete message $s$, $\hat{s}$, R and $\phi$ must be considered as being time-dependent.

And the error, considered time-dependent, made when receiving vectors $\vec{OX}$ instead of fectors $\vec{OT}$, can be expressed by means of two components ds and dŝ, which will be written, after simplification:

$d\hat{s} = \sin \phi \, dR + R \cos \phi \, d\phi$ $ds = \cos \phi \, dR - R \sin \phi \, d\phi$ where R, $\phi$, $dR$, $d\phi$, $ds$ and $d\hat{s}$ are of course time-dependent.

By re-introducing terms $s$ and $s$, there is obtained:

$$ds = s \, dR/R - \hat{s} \, d\phi \quad (1)$$

It should be noted that, since the axes of the diagram are quite arbitrary, ŝ can be considered as being the signal received from the line and s is the signal in quadrature, i.e., the received signal rotated through an angle of 90°.

From this theoretical analysis, this invention proposes a process and a device for equalizing a phase-modulation transmission and, more specifically, for generating an error signal to adjust an equalizer. The experiment has shown that the information obtained from the two error components $ds$ and $d\hat{s}$ was, in fact, highly redundant and that it was possible to obtain a satisfactory adjustment of the equalizer when taking only part of such information into account. In other terms, it has been stated that the equalizer convergence (i.e., its capacity to approach to a satisfactory adjustment) was ensured when taking a portion of this information into account, the rest of the information being used only to increase the speed of convergence (i.e., to decrease the time length necessary for the equalizer to reach a satisfactory adjustment).

This invention suggests as for an error signal:

$e(t) = s \, dR/R$ where s is the equalized signal and where $dR/R$ is the relative amplitude error measured on the envelope of the equalized signal.

From a physical point of view, the error signal $e(t)$ corresponding to the first term of ds in expression (1) above, is defined as a portion of instantaneous amplitude s of the equalizer output signal, that is to say such instantaneous amplitude s weighted by a coefficient. Such coefficient is $dR/R$ i.e., a relative amplitude error measured on the envelope of the equalizer output signal.

In its most general aspect, this invention relates to a method for equalizing a phase-modulation transmission on a transmission medium which introduces linear distortions into the transmitted signals, of the type which includes the following steps:

- subjecting the distorted signal received from the transmission medium to the action of a variable transfer function transversal filter so as to obtain an equalized signal,
- generating an adjustment error signal by comparing the equalized signal to a reference signal at instants determined by a sampling clock producing signals at the data transmission rate,
- adjusting the transfer function of the transversal filter so as to tend to cancel said adjustment error signal, characterized in that the step for generating an adjustment error signal includes the following operations,

- measuring the amplitude of the envelope of said equalized signal at instants determined by the sampling clock,
- comparing such an envelope amplitude with a reference amplitude so as to generate an envelope error signal and
- multiplying at instants determined by the sampling clock, said envelope error signal with the equalized signal so as to generate an adjustment error signal.

According to a more particular aspect of the invention, the amplitude error is measured by frequency-transposing the equalized signal, detecting the time when such a transposed signal goes through zero for the first time within a sampling pulse occuring at the data rate, measuring the amplitude of the transposed signal one quarter of a period after said zero crossing and comparing this amplitude with a reference amplitude level.

This invention relates also to a device for generating an error signal, which is comprised of:

- transposition means receiving the equalized signal in order to transpose it at a higher frequency and supply a transposed signal,
- rectifying means receiving said transposed signal in order to supply a rectified transposed signal,
- comparison means receiving said rectified transposed signal in order to compare it with a reference amplitude signal at determined instants and produce a binary signal indicative of the sign of the difference,
- sign detection means receiving the equalized signal in order to produce a binary signal indicative of the sign of said signal, and
- binary multiplication means receiving the signal produced by the comparison means and the signal produced by the sign detection means in order to produce an error signal in the form of a binary level.

BRIEF DESCRIPTION OF THE DRAWINGS

This invention will be further disclosed with reference to the accompanying drawings, in which.

DESCRIPTION OF THE PREFERRED EMBODIMENT

In the following description, it will be assumed that the transmission makes use of phase modulation technique by means of n distinct phases of a transmission carrier Fp, where $n = 2^k$. In practice, $k$ can be equal to 2, 3 or 4, which will mean a four, eight, or 16-phase modulation.

Figure 1:
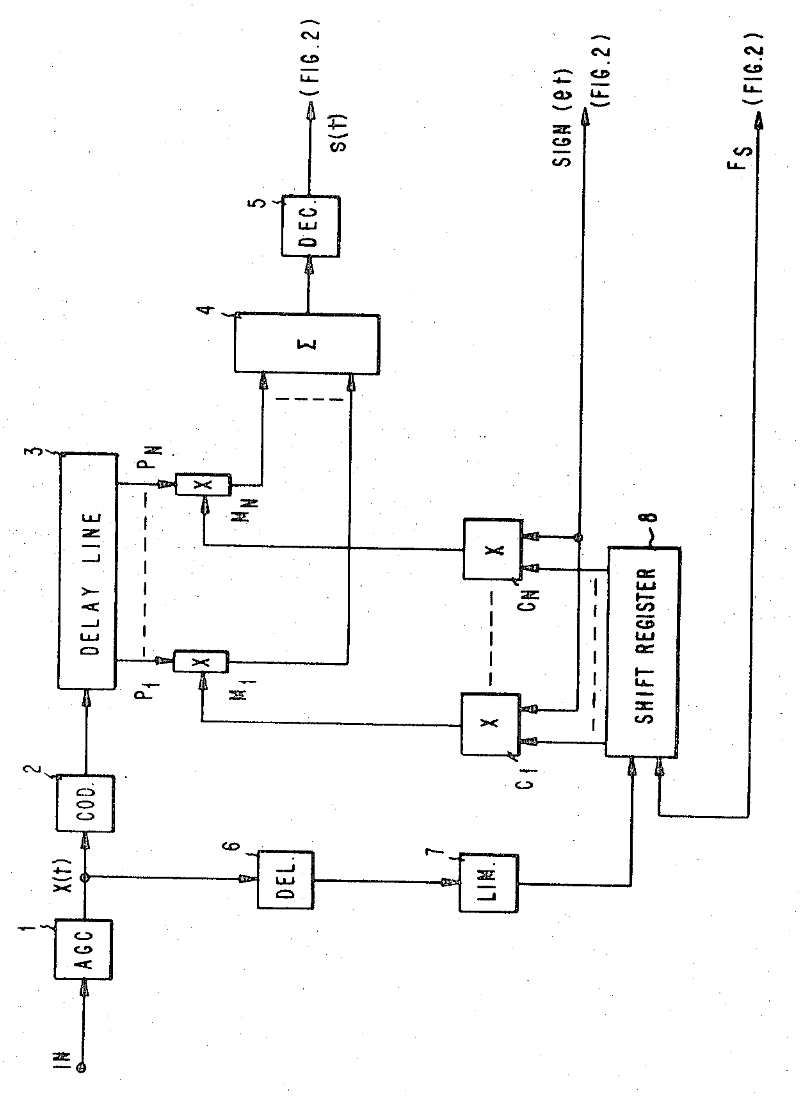
FIG. 1 is a schematic diagram of an automatic transversal equalizer wherein the error generation technique according to this invention can be applied.

FIG. 1 shows a schematic diagram of an automatic adaptive equalizer the principle of which is well-known and with which an error signal generation circuit according to this invention, can be utilized. The general principle of such an equilizer is disclosed in chapter VI of the abovementioned book by Lucky, Salz and Weldon Jr. The particular implementation used here is disclosed under the title "Modified Zero Forcing" in the article of Hirsch and Wolf published in "Wescon Technical Papers" 1969, part IV, section 11.2 published by Wescon IEEE and entitled: "A Simple Adaptive Equalizer for Efficient Data Transmission."

The signal received from the transmission line is applied to input terminal E and, then, passes through an automatic gain control device 1 used to calibrate the signal amplitude. The so-calibrated signal, which will be designated by $x(t)$, is coded in the digital form by means of a coder which, for instance, can be a delta-coder. The output of coder 2 is connected to the input of a digital delay line 3 provided with equally time-spaced taps P1 through $P_N$ with a delay $\tau$ between any two adjacent taps. Variable coefficient digital multipliers $M_1$ through $M_N$ are respectively mounted upon taps $P_1$ through $P_N$ and the outputs of said multipliers are applied to the inputs of an adder 4. The output signal of adder 4 is applied to a decoder 5, for instance, a delta decoder in order to converted back into analog form.

Figure 2:
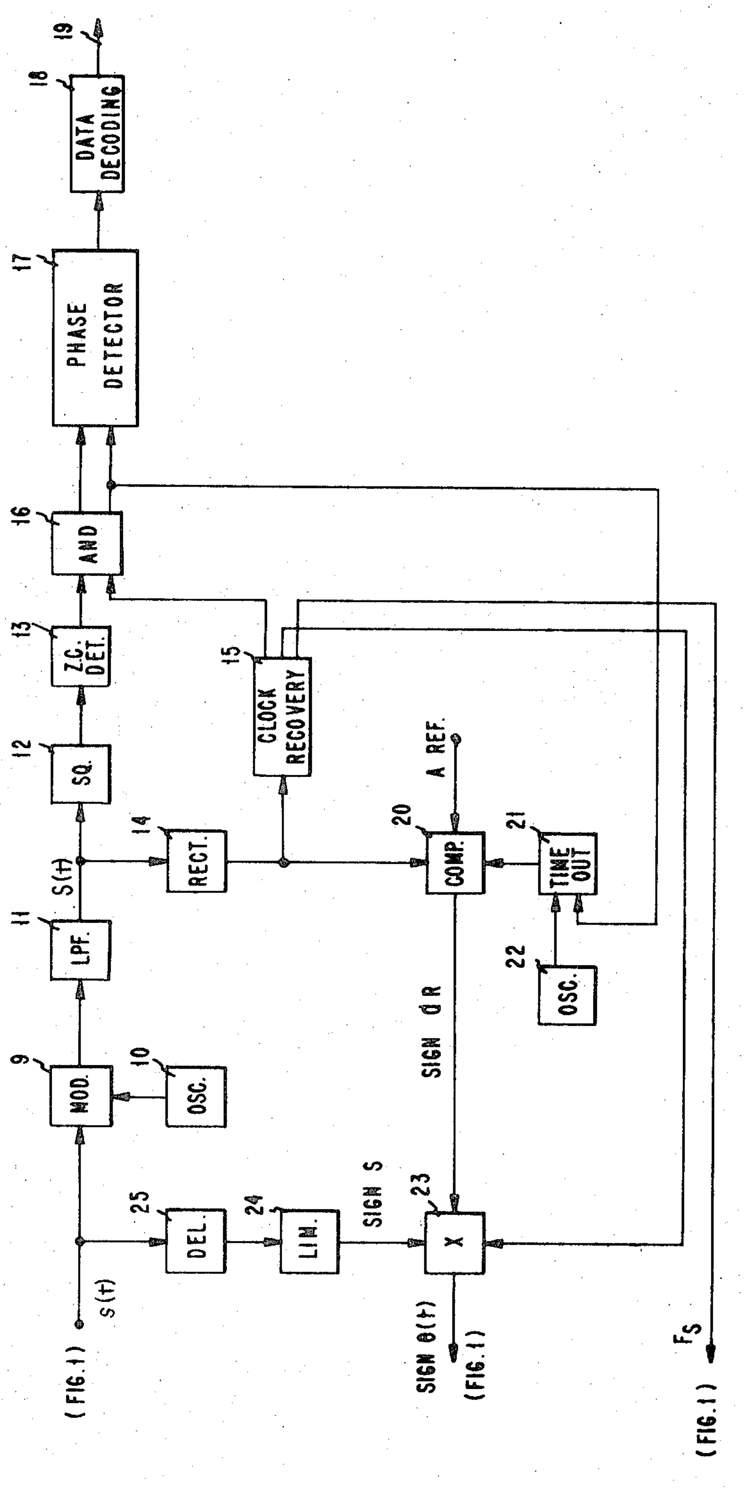
FIG. 2 is a schematic diagram of an embodiment of the circuits for generating an error signal, according to this invention.

In addition, the output signal of the automatic gain control device 1 is applied through a delay element 6, to a limiter 7 which supplies binary information about the sign of the signal. The output of limiter 7 is applied to the input of a shift register 8 having N equally time-spaced taps with a unitary time delay $\tau$ between any two adjacent taps and a shift frequency $F_S$ supplied by a clock 15 (FIG. 2). The N outputs of register 8 are applied to N correlators $C_1$ through $C_N$, respectively which also receive a "sign $e(t)$" signal the generation of which will be described later on. The outputs of the correlators determine the adjustment of the coefficients of multipliers $M_1$ through $M_N$. This adjustment is made, as shown in the above-mentioned article by Hirsch and Wolf, in order to render minimal the following correlation function fulfilled by correlator $C_1$:

$$\rho_i = \int_{t_0+T}^{t_0} \text{sign } x(t-i\tau)\cdot \text{sign } e(t)dt$$

where T is representative of a given integration interval.

The foregoing applies to an automatic transversal equalizer of conventional type. The invention relates to the generation of error signal $e(t)$ and this operation will now be described with reference to FIG. 2.

The equalized signal restored to the analog form will be designated by $s(t)$ is available from the digital-to-analog converter 5 and is applied to a modulator 9 modulating a carrier $F^1$ produced by oscillator 10. The signal coming from modulator 9 is applied to a filter 11 which removes a modulation side band. The so-filtered signal, designated by $S(t)$, is applied to a squarer 12 and, then, to a zero-crossing detector 13. On the other hand, signal $S(t)$ is applied to a full-wave rectifier 14 which feeds clock recovery circuits 15. Such circuits generate a sampling signal at data rate F, which is applied to one input of coincidence detector 16 which may be an AND gate. The other input of detector 16 receives the output signal from zero-crossing detector 13. The output of detector 16 is connected to the input of a phase discriminating circuits 16. These circuits will not be disclosed hereinafter for they are well-known in this art and are not part of this invention. These circuits detect the phase information carried by $S(t)$ and apply it to decoding circuits 18 in order to recover the transmitted digital data at terminal 19.

The output signal of rectifier 14 is applied to an amplitude comparator 20 which receives also a reference amplitude level $A_{ref}$ and a control signal from a time-out circuit 21. Circuit 21 receives a reference frequency signal from oscillator 22 and is controlled by the output signal of coincidence detector 16. "Sign $d$R" signal is obtained at the output of comparator 20, which signal is applied to an input of an Exclusive OR circuit 23. The other input of said circuit 23 receives "Sign $s$" signal from a limiter 24. Limiter 24 receives signal $s(t)$ through a delay circuit 25. Exclusive OR circuit 23 operates at time-instants defined by clock circuits 15 at the data rate, and the output signal is maintained between two successive time instants in order to form "Sign $e(t)$" signal to be applied to correlators $C_1$ through $C_N$ in FIG. 1.

The operation of the above circuits for the generation of the error signal will now be described with reference to FIGS. 2 and 3.

The equalizer output signal, once in analog form, is frequency transposed. Such frequency transposition is classical in the phase modulation communication art where it serves generally two purposes: first it makes data recovery using zero-crossing detection easier by concentrating the equalized signal possible zero-crossings in a relatively shorter period of time, secondly it makes more practical and more accurate the recovery of the equalized signal envelope since it is easier to recover the envelope of a high frequency signal than a low frequency one, it being understood that a signal envelope is not modified by frequency transposition. In the preferred embodiment of the invention, both advantages of frequency transposition are taken into account to help define R and dR as it will be apparent later on. However, it should be understood that such transposition is by no means a mandatory requirement for obtaining R and $d$R, other methods being available to those skilled in the art.

Transposition is carried out in modulator 9 which receives transposition carrier $F^1$ produced by oscillator 10. Low-pass filter 11 removes a modulation sideband at the output of modulator 9 and supplies signal $S(t)$ which is signal $s(t)$ transposed in a higher frequency domain. Because of low-pass filter 11, $S(t)$ has a frequency spectrum centered on frequence $F_T = F_p{}^1\text{-}F_P$, where $F_p$ is the carrier used for transmission and where $F_p{}^1$ is the carrier used for transposition.

It is not possible to represent analog signals $s(t)$ and $S(t)$ on a drawing. In fact, $s(t)$ would appear most of the time as an intricate superimposition of waveforms resulting from transients generated by each phase skip on the carrier. Such transients interfere with both the previous and the following signals and it is only in the middle of an interval between two consecutive phase skips that the picture becomes clear and resembles a pure sinewave, if equalization is correct. Classically, the sampling instants (or windows) are chosen to coincide with those areas where the picture is clear, i.e., in the middle of an interval between two phase skips on the carrier. The same holds true for frequency transposed signal $S(t)$ which exhibits the same envelope as $s(t)$ and which resembles also a sine-wave around the sampling instants, but of a higher frequency of course. In FIG. 3, the sine-wave portion of $S(t)$ has been schematically shown. It will be understood that, on both sides of this portion, signal $S(t)$ becomes a more and more complicated array of interfering waveforms.

The signal $S(t)$ is applied to squarer 12 the function of which is to square signal $S(t)$. Signal $S(t)$ is rectified in rectifier 14. From this rectified signal, clock recovery circuits 15 (not shown in details) make it possible to recover the data rate $F_c$ according to the well-known envelope detection technique (for an example, see: Contribution for Special Committe A, No. 143, October 1967, published by CCITT, Geneva, Switzerland or CCITT White Book 1968, Vol. VIII Question 1/A, Point *z* Annex 2). Circuits 15 supply a sampling pulse at frequency $F_c$ which is of a sufficient time length to ensure that all possible zero-crossing points for the information carried by signal $S(t)$ at the considered sampling time stand within the time length of said pulse. This is achieved by giving the sampling pulse a time length slightly longer than half a period of the basic frequency of signal $S(t)$, namely, a time length equal to $1/2F_T+\epsilon$. Such a pulse is represented on line A in FIG. 3. It is used as the authorization signal for coincidence detector 16. Circuits 15 supply also a signal of frequency $F_S$ which is a multiple of $F_c$ for use in shift register 8 (FIG. 1). The function of such a frequency $F_S$ will be studied further on. Detector 16, on the other hand, receives an indication from detector 13 about the successive zero-crossings of signal $S(t)$ squared in squarer 12.

Figure 3:
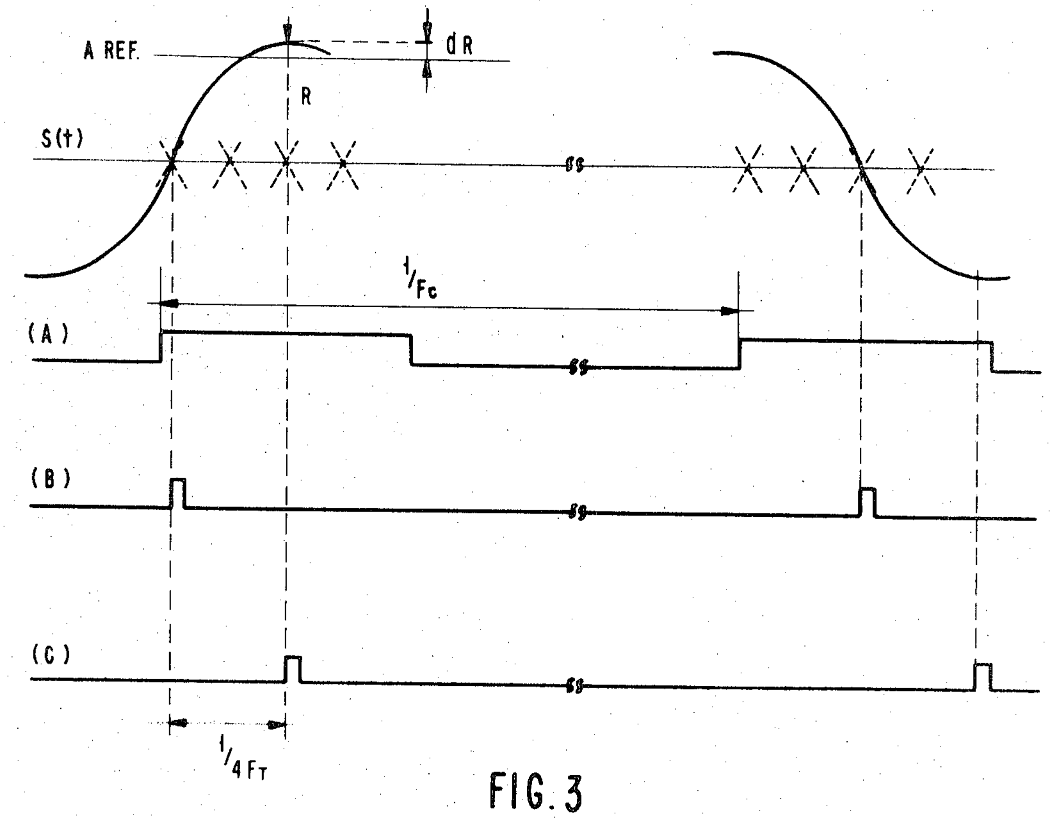
FIG. 3 is a time diagram for the various signals used in the circuits shown in FIG. 2.

Such a detector 16 produces a signal when signal $S(t)$ goes through zero for the first time in the sampling pulse (line B in FIG. 3). This signal produced by detector 16 is applied to phase discriminating circuits 17 for phase detection and data decoding purposes according to conventional techniques which do not pertain to this invention.

Now, the measurement of the error in the amplitude must be examined. It is a well-known fact, in phase-modulation technique, that when there is no distortion during the transmission, the envelope of the data signal goes through constant amplitude points whatever be the data transmitted, and that these points occur at the data rate. In addition, it is this very property which enables the data clock to be recovered from the envelope of the signal. Indeed, the distortions introduced by the transmission medium cause fuzziness about these points and do so as long as the transmission is not perfectly equalized. The measurement of such fuzziness, therefore, makes it possible to derive an error signal for the equalizer adjustment. It is difficult to rigorously measure the amplitude of the envelope at those points corresponding to the sampling times. Nevertheless, a very good approximation is obtained when considering that the point where the envelope presents a constant amplitude correspond to the maximum of the signal transposed in the vicinity of the sampling times. It is upon this basis that the measurement of the amplitude error is carried out.

The generation of the amplitude error signal is carried out on the rectified signal coming from rectifier 14 by comparing, at determined instants, the rectified signal amplitude with a reference amplitude $A_{ref}$ in amplitude comparator 20. The chosen comparison instants are those where the amplitude of the rectified signal $S(t)$ is a maximum, i.e., those which correspond to the maxima of carrier $F_T$. It is known that they are found one quarter of a period of the carrier after a zero-crossing. Therefore, as soon as a zero crossing is indicated by the output of coincidence detector 16, the time out circuit 21 is operated. This circuit 21 receives a wave generated by oscillator 22 at a frequency $mF_T$ and, as soon as it is operated by the pulse received from detector 16, it starts counting $m/4$ periods of the wave generated by oscillator 22. When such a count is reached, circuit 21 produces a control pulse for comparator 20 (line C of FIG. 3). Comparator 20, then, compares the amplitude of the rectified signal $S(t)$ received from rectifier 14 with the reference amplitude level $A_{ref}$ in order to provide a binary indication about the sign of the difference. Such a binary indication will be represented by "sign $d$R" according to the above-mentioned notations.

Before proceeding with the description of the operation, a few remarks makes the product sign $s$ $x$ sign $d$R in order to supply the error signal sign $e(t)$ to be used in the coefficient adjusting circuits of the equalizer, in a conventional manner. Such a product is computed at each sampling instant indicated by clock circuits 15 and its value is maintained between two successive sampling instants. It should be noted that the ambiguity about the meaning of "sign $d$R" information is removed at the output of circuit 23 since it takes the corresponding sign of $s(t)$ into consideration.

The adjusting circuits in FIG. 1, then, operates as follows: correlators $C_1$ through $C_N$ receive, each, error signal "sign $e(t)$" and, on the other hand, they receive, each, a different output signal from the shift register. Register 8 receives binary information about the sign of the data signal at successive instants. To this end, the received and calibrated data signal in circuit 1 is first, delayed in delay circuit 6. Such a delay circuit utilized to compensate for the propagation time of the signal over the main processing circuit of said signal. Delay 6 is experimentally determined from the propagation time of the signal in the main circuit, a time which depends on the involved circuit elements. It should be noted that this time will be equal to delay 25, mentioned above, plus the delay introduced into the signal by the main circuit elements of the equalizer. The so-delayed signal is applied to limiter 7 the output of which is sent to shift register 8. The latter samples the output of limiter 7 at frequency $F_S$. It should be remarked, here, that the samples contained at a given instant in register 8 are to be correlated with the error signal from comparator 20. Since such an error signal is taken at instants defined by data frequency $F_c$, the samples coming from register 8 must correspond to the same portion of the data signal as the one which has been used to define the error signal, in order to ensure a significant correlation. That is why the shift frequency of register 8 (i.e., the sampling frequency of the output of limiter 7) must be a multiple common to data frequency $F_c$ and to $1/\tau$, where $\tau$ is the unitary delay in delay line 3 and in shift register 8. This is easily achievable in the practice, and clock 15, which already supplies $F_c$, is utilized to supply the necessary multiple of $F_c$ which will be representative of $F_S$.

Thus, a preferred embodiment of the invention has been disclosed which has been implemented with digital techniques. But it is obvious that analog type techniques could have been used as well. Thus, for instance, instead of considering only the sign of the amplitude error in comparator 20, the relative value of the amplitude error $dR/R$ could have, as well, been measured and multiplied by the sign of $s(t)$ at the corresponding instant in a multiplier which could be used instead of Exclusive OR circuit 23. Thus, an analog signal $e(t)$ would be obtained which would, then, be applied to analog correlators $C_1$ through $C_N$ (the latter being comprised of multipliers and analog integrators) for the adjustment of the equalizer taps. With such an assumption, of course, delay line 5 would be of the analog type and analog-to-digital converter 2 would be removed as well as digital-to-analog converter 5. In addition, the other input of each of correlators $C_1$ through $C_N$ would no longer be the sign of $x(t-i\tau)$ but this very signal $x(t-i\tau)$ taken directly at the corresponding tap of delay line 3. This solution would be advantageous since it would ensure a more rapid convergence of the equalizer but would lose the constructional simplicity inherent in the digital techniques.

The relative error $dR/R$ could also be generated at the output of comparator 20 and could be multiplied by the value of $s(T)$ at the instant considered in an analog multiplier which could be substituted for Exclusive OR circuit 23. The rest of the circuits would be the same as those used in the preceding example. Here, also, the convergence speed of the equalizer would be increased to the detriment of a larger complexity of the analog circuit used for the generation of the error signal.

It should also be noted that the technique used for the measurement of the amplitude of the envelope is only one possible example for the embodiment thereof. Those skilled in the art will be able to make use of other techniques and, more particularly, the technique which consists in extracting directly the envelope from signal $S(t)$ through rectifying and bandpass filtering operations according to a conventional method, and in measuring the real amplitude of said envelope in the vicinity of the sampling instants.

It is clear that the preceding description has only been given as an unrestrictive example and that numerous alternatives may be considered without departing from the spirit and scope of the invention.

What is claimed is:

1. A method for equalizing the transmission of a PSK-modulation transmitted data signal onto a transmission medium introducing linear distortions into the transmitted signals, of the type which includes the steps of subjecting the distorted signal received from the transmission medium to the action of a variable transfer function transversal filter so as to obtain an equalized signal, generating an adjustment error signal by comparing the equalized signal to a reference signal at instants determined by a sampling clock producing signals at the data transmission rate and adjusting the transfer function of the transversal filter so as to tend to minimize said adjustment error signal, characterized in that the step for generating an adjustment error signal includes the following operations:

comparing the amplitude of the envelope of said equalized signal at first instants determined by the sampling clock with a reference amplitude so as to generate an envelope error signal;

multiplying at second instants determined by the sampling clock said envelope error signal with the equalized signal so as to generate an adjustment error signal.

2. A method according to claim 1, characterized in that the step of comparing the envelope amplitude with a reference amplitude includes the detection of the sign of the difference between the two amplitudes, and the generation of an element of information about said sign as the envelope error signal.

3. A method according to claim 2 characterized in that the multiplication step includes the following operations:

taking the sign of the equalized signal, multiplying said sign by said envelope error signal at instants determined by the sampling clock.

4. A method according to claim 1, characterized in that the step of comparing the equalized signal envelope amplitude with a reference amplitude includes the following operations:

transposing said equalized signal into a higher frequency domain to obtain a transposed signal, comparing the amplitude of the envelope of said transposed signal at first instants determined by the sampling clock with a reference amplitude.

5. A method according to claim 4, characterized in that the step of comparing the amplitude of the envelope of the transposed signal with a reference amplitude includes the following operations:

determining a sampling interval from the sampling clock, detecting the first zero-crossing of the transposed signal within said sampling interval, comparing the amplitude of said transposed signal at an instant occurring one quarter of a period of the transposed signal after said first zero-crossing.

6. A method according to claim 5, characterized in that the step of comparing the amplitude of the envelope of the transposed signal with a reference amplitude further includes the following operations:

rectifying said transposed signal before comparing the amplitudes so that the comparison is carried out on the rectified transposed signal.

7. In a data transmission system using PSK modulation for transmitting data onto a transmission medium introducing linear distortions into the transmitted data and including in the receiving part thereof an equalizer which provides an equalized signal and the transfer function of which may be adjusted so as to minimize an equalizer output error signal, an equalizer output error signal generation device characterized in that it includes:

transposition means receiving the equalized signal in order to transpose it to a higher frequency and supply a transposed signal, rectification means receiving said transposed signal in order to supply a rectified transposed signal, comparison means receiving said rectified transposed signal in order to compare it with a reference amplitude signal at determined instants, and generate a binary signal indicative of the sign difference, sign detection means receiving the equalized signal in order to supply a binary signal indicative of the sign of said signal, and binary multiplication means receiving the signal generated by the comparison means and the signal generated by the sign detection means in order to generate an error signal in the form of a binary level.

* * * * *